United States Patent
Zheng et al.

(10) Patent No.: US 11,327,477 B2
(45) Date of Patent: May 10, 2022

(54) SOMATOSENSORY REMOTE CONTROLLER, SOMATOSENSORY REMOTE CONTROL FLIGHT SYSTEM AND METHOD, AND HEAD-LESS CONTROL METHOD

(71) Applicant: POWERVISION ROBOT INC., Beijing (CN)

(72) Inventors: Weifeng Zheng, Beijing (CN); Baoyi Zhang, Beijing (CN); Yanqing Yang, Beijing (CN); Lingjun Meng, Beijing (CN)

(73) Assignee: POWERVISION ROBOT INC., Beijing (CN)

( * ) Notice: Subject to any disclaimer, the term of this patent is extended or adjusted under 35 U.S.C. 154(b) by 318 days.

(21) Appl. No.: 16/067,557

(22) PCT Filed: Jun. 20, 2016

(86) PCT No.: PCT/CN2016/086473
§ 371 (c)(1),
(2) Date: Jun. 29, 2018

(87) PCT Pub. No.: WO2017/113648
PCT Pub. Date: Jul. 6, 2017

(65) Prior Publication Data
US 2019/0004509 A1    Jan. 3, 2019

(30) Foreign Application Priority Data

Dec. 31, 2015 (CN) .......................... 201511032422.8
Apr. 1, 2016 (CN) .......................... 201620268295.5
(Continued)

(51) Int. Cl.
*G05D 1/00* (2006.01)
*G08C 17/02* (2006.01)
(Continued)

(52) U.S. Cl.
CPC .......... *G05D 1/0016* (2013.01); *G01C 21/10* (2013.01); *G01S 19/13* (2013.01); *G05D 1/005* (2013.01);
(Continued)

(58) Field of Classification Search
None
See application file for complete search history.

(56) References Cited

U.S. PATENT DOCUMENTS

| 8,456,329 | B1 | 6/2013 | Tran et al. |
| 2009/0153349 | A1 | 6/2009 | Lin et al. |

(Continued)

FOREIGN PATENT DOCUMENTS

| CN | 1015985568 | 5/2011 |
| CN | 103218059 A | 7/2013 |

(Continued)

OTHER PUBLICATIONS

European Search report for counterpart EP application 16880456.5 dated Jul. 22, 2019.
(Continued)

*Primary Examiner* — Lail A Kleinman
(74) *Attorney, Agent, or Firm* — WPAT, P.C., Intellectual Property Attorneys; Anthony King

(57) ABSTRACT

Disclosed are a somatosensory remote controller, a somatosensory remote control flight system and method, and a remote control method. The somatosensory remote controller comprises: a motion sensor, a controller, a first transmission module, and a remote controller body. The motion sensor, the first transmission module, and the controller are all disposed on the remote controller body, and the motion sensor and the first transmission module are electrically connected to the controller. The motion sensor acquires initial state information of a current position of the remote (Continued)

controller body and movement information about movement of the remote controller body, and transmit the same to the controller. The controller is configured to receive, according to the initial state information and the movement information, a flight instruction, and send the flight instruction via the first transmission module.

20 Claims, 7 Drawing Sheets

(30) Foreign Application Priority Data

| May 6, 2016 | (CN) | 201610297215.3 |
|---|---|---|
| May 6, 2016 | (CN) | 201610299333.8 |

(51) Int. Cl.

| G05D 1/08 | (2006.01) |
|---|---|
| G06F 3/00 | (2006.01) |
| G01C 21/10 | (2006.01) |
| G01S 19/13 | (2010.01) |
| G05D 1/10 | (2006.01) |
| B64C 39/02 | (2006.01) |

(52) U.S. Cl.
CPC ......... *G05D 1/0022* (2013.01); *G05D 1/0033* (2013.01); *G05D 1/08* (2013.01); *G05D 1/0808* (2013.01); *G05D 1/101* (2013.01); *G06F 3/00* (2013.01); *G08C 17/02* (2013.01); *B64C 39/024* (2013.01); *B64C 2201/127* (2013.01); *B64C 2201/145* (2013.01); *B64C 2201/146* (2013.01)

(56) References Cited

U.S. PATENT DOCUMENTS

| 2009/0204276 | A1 | 8/2009 | Kellner et al. | |
|---|---|---|---|---|
| 2010/0228406 | A1* | 9/2010 | Hamke | G05D 1/0094 701/3 |
| 2011/0162015 | A1 | 6/2011 | Holyoake et al. | |
| 2011/0246015 | A1 | 10/2011 | Cummings et al. | |
| 2012/0083945 | A1* | 4/2012 | Oakley | B64C 25/52 701/2 |
| 2014/0008496 | A1* | 1/2014 | Ye | B64C 13/20 244/190 |
| 2016/0068267 | A1* | 3/2016 | Liu | G05D 1/0088 701/4 |
| 2016/0189537 | A1 | 6/2016 | Huang | |
| 2017/0068242 | A1 | 3/2017 | Liu | |
| 2017/0123413 | A1 | 5/2017 | Ye et al. | |
| 2017/0185081 | A1* | 6/2017 | Steele | G09B 9/00 |
| 2018/0046177 | A1* | 2/2018 | Hu | G08C 17/02 |

FOREIGN PATENT DOCUMENTS

| CN | 203253153 U | 10/2013 |
|---|---|---|
| CN | 203315750 U | 12/2013 |
| CN | 103712598 B | 4/2014 |
| CN | 103940442 A | 7/2014 |
| CN | 104298248 B | 1/2015 |
| CN | 1045364538 | 4/2015 |
| CN | 104714556 B | 6/2015 |
| CN | 104808675 A | 7/2015 |
| CN | 104898699 A | 9/2015 |
| CN | 105223959 B | 1/2016 |
| CN | 105469579 A | 4/2016 |
| CN | 105469579 B | 4/2016 |
| CN | 105549608 A | 5/2016 |
| EP | 3306432 A1 | 4/2018 |
| WO | 2011044148 A1 | 4/2011 |
| WO | 2014187027 A1 | 11/2014 |
| WO | 2015176248 A1 | 11/2015 |

OTHER PUBLICATIONS

Extended European Search Report of EP family Application (Application No./Patent No. 16880456.5-1204/3399380 PCT/CN2016086473), dated Nov. 20, 2019.
International Search Report of PCT/CN2016/086473.
English Abstract Translation of Foreign Patent Document No. CN104808675A.
English Abstract Translation of Foreign Patent Document No. CN105469579A.
First Office Action dated Mar. 1, 2019 of application CNA201610297215.3 from China National Intellectual Property Administration (attached with extended search report, CN104536453B, CN101598556B, 105223959B, 105549608A, CN105469579B, CN104714556B, WO2014187027A1, CN104298248B, and CN104180796A).
Second Office Action dated Aug. 9, 2019 of application CNA201610297215.3 from China National Intellectual Property Administration (attached with extended search report, CN104536453B, CN101598556B, 105223959B, 105549608A, CN105469579B, CN104714556B, WO2014187027A1, CN104298248B, and CN104180796A).
First Office Action CNA201610299333 dated Mar. 1, 2019 from China National Intellectual Property Administration.
First Office Action of application CNU201620268295 dated Jul. 11, 2016 from China National Intellectual Property Administration.
Office Action of EP application 16880456.5 from European patent office dated Oct. 2, 2020.
Second Office Action of application CNA201610299333 dated Sep. 12, 2019 from China National Intellectual Property Administration.
Rejection Decision of application CNA201610299333 dated Jan. 17, 2020 from China National Intellectual Property Administration.
Extended Search Report for Foreign Office Action CNA201610299333.
Extended Search Report for Foreign Office Action CNA201610297215.
First Office Action of application CNA201511032422 dated Jul. 20, 2018 from China National Intellectual Property Administration (attached with CN104808675A, CN103218059A, CN203315750U, and CN103940442A).
Second Office Action of application CNA201511032422 dated Mar. 4, 2019 from China National Intellectual Property Administration (attached with CN104808675A, CN103218059A, CN203315750U, and CN103940442A).
Rejection Decision of application CNA201511032422 dated Jun. 20, 2019 from China National Intellectual Property Administration (attached with CN104808675A, CN103218059A, CN203315750U, and CN103940442A).
English Abstract Translation of Foreign Reference CN104808675B.
English Abstract Translation of Foreign Reference CN103218059A.
English Abstract Translation of Foreign Reference CN203315750U.
English Abstract Translation of Foreign Reference CN104536453B.
English Abstract Translation of Foreign Reference CN105469579B.
English Abstract Translation of Foreign Reference CN203253153U.
English Abstract Translation of Foreign Reference CN103940442B.
English Abstract Translation of Foreign Reference CN101598556B.
English Abstract Translation of Foreign Reference CN103712598B.
English Abstract Translation of Foreign Reference CN105223959B.
English Abstract Translation of Foreign Reference CN105549608A.
English Abstract Translation of Foreign Reference CN105469579A.
English Abstract Translation of Foreign Reference CN104714556B.
US 2016/0189537 is the counterpart for WO2014187027A1.
English Abstract Translation of Foreign Reference CN104298248B.
English Abstract Translation of Foreign Reference CN104180796A.
US 20170123413 is the US couterpart for CN105278544A.
English Abstract Translation of Foreign Office Actions in Prosecution History of CNA201610297215.3.

(56) References Cited

OTHER PUBLICATIONS

English Abstract Translation of Foreign Office Actions in Prosecution History of CNA201610299333.
English Abstract Translation of Foreign Office Action 201620268295. 5.
English Abstract Translation of Foreign Office Actions in Prosecution History of CNA201511032422.

* cited by examiner

SOMATOSENSORY REMOTE CONTROLLER, SOMATOSENSORY REMOTE CONTROL FLIGHT SYSTEM AND METHOD, AND HEAD-LESS CONTROL METHOD

CROSS-REFERENCE TO RELATED APPLICATION

This application claims priority to Chinese patent application No. 201511032422.8, titled "SOMATOSENSORY REMOTE CONTROLLER, SOMATOSENSORY REMOTE CONTROL FLIGHT SYSTEM AND METHOD" and filed with the Chinese State Intellectual Property Office on Dec. 31, 2015, Chinese patent application No. 201620268295.5, titled "SOMATOSENSORY REMOTE CONTROLLER FOR UNMANNED AERIAL VEHICLE" and filed with the Chinese State Intellectual Property Office on Apr. 1, 2016, Chinese patent application No. 201610299333.8, titled "SOMATOSENSORY CONTROL METHOD" and filed with the Chinese State Intellectual Property Office on May 6, 2016, and Chinese patent application No. 201610297215.3, titled "HEAD-LESS CONTROL METHOD" and filed with the Chinese State Intellectual Property Office on May 6, 2016, the entire invention of which are hereby incorporated by reference in its entirety.

FIELD OF THE DISCLOSURE

The disclosure relates to the field of electronic devices, and in particular to a somatosensory remote controller, a somatosensory remote control flight system and method, and a head-less control method.

BACKGROUND OF THE DISCLOSURE

The unmanned aerial vehicle is referred to as "UAV" in brief, and is an unmanned aircraft that is operated by using a radio remote control device and a self-contained program control device. There is no cockpit in the aircraft, but an autopilot and a program control device are installed in the aircraft. The personnel of remote control stations on the ground, the ship, or the parent aircraft performs tracking, locating, remote control, remote measurement, and digital transmission operations on the UAV by means of radar or the like. The UAV can take off like a normal aircraft under the radio remote control or can be launched off by using a booster rocket, or may also be brought into the air by the parent aircraft for flight. When recycled, the UAV may automatically land in the same way as a normal aircraft landing process, or may be recycled by remotely controlling a parachute or receiving by a mesh. The UAV may be reused for multiple times. The UAV may be widely used in aerial reconnaissance, surveillance, communication, anti-submarine, electronic interference or the like. For the ease of operating the UAV more easily for operators, a somatosensory remote controller is designed.

The somatosensory remote controller in the prior art comprises a remote controller body, a sensor and a controller that are arranged on the remote controller body, wherein the sensor is electrically connected to the controller, and the sensor is used to acquire the movement direction of the remote controller body and to transmit the movement direction to the controller. The controller is used to control the flight of the UAV according to the movement direction.

However, when the somatosensory remote controller in the prior art is used, the remote controller body needs to be placed at the center position, which is located at a fixed position, and the operator must locate the somatosensory remote controller at the center position so that the somatosensory remote controller can be used to control the UAV. Therefore, the somatosensory remote controller in the prior art has a high requirement on the technical level of the operator and the operator's operation is not facilitated.

In addition, a typical UAV has a head. When the UAV is flying within a short distance range, the user can see the head of the UAV with their eyes. However, once the UAV flies far away or the flying distance of the UAV is beyond the visual range of the user, the user cannot distinguish the direction of the head of the UAV with his/her eyes and thus cannot well control the flight of the UAV; accordingly, the UAV may fly uncontrolledly, and thus there is a great safety risk.

SUMMARY OF THE DISCLOSURE

An object of the present disclosure is to provide a somatosensory remote controller, a somatosensory remote control flight system and method, and a head-less control method, with the purpose of addressing the technical problem in the prior art that the operator's operation is not facilitated.

A somatosensory remote controller is provided according to an embodiment of the disclosure, which comprises: a motion sensor, a controller, a first transmission module, and a remote controller body, wherein the motion sensor, the first transmission module and the controller are all arranged on the remote controller body, and the motion sensor and the first transmission module are electrically connected to the controller, the motion sensor being configured to obtain an initial state information of an initial position of the remote controller body, and a movement information of the movement of the remote controller body, and to transmit the initial state information and the movement information to the controller, the controller being configured to obtain a flight instruction according to the initial state information and the movement information, and to transmit the flight instruction via the first transmission module, and the first transmission module supporting one or more transmission means of Bluetooth transmission, wireless fidelity WiFi transmission, infrared transmission, mobile network transmission, and wired transmission.

A somatosensory remote control flight system is further provided according to an embodiment of the present disclosure, comprising an on-board flight control system and any one of the afore-mentioned somatosensory remote controllers, wherein a second transmission module is arranged on the on-board flight control system, and the second transmission module is communicatively connected to the first transmission module in a wireless manner; the on-board flight control system is used to control the unmanned aerial vehicle to fly in response to the flight instruction.

A somatosensory remote control flight method is provided according to an embodiment of the disclosure, which comprises the following steps:

locating a current position of a remote controller body as an initial position when it is detected that a somatosensory remote control flight mode is activated, obtaining an initial state information of the remote controller body using a motion sensor, and transmitting the initial state information to a controller;

obtaining a flight instruction by the controller according to the initial state information and the movement information; and transmitting the flight instruction to an on-board flight control system by the controller, and the on-board flight control system controlling an unmanned aerial vehicle (UAV).

A head-less control method is further provided according to an embodiment of the disclosure, the head-less control method comprising the following steps:

S1: receiving a head-less control instruction by a remote controller;

S2: calculating a heading angle theta of the remote controller pointing to an unmanned aerial vehicle (UAV) by the remote controller in real time;

S3: obtaining a rotation matrix DCM according to the heading angle theta;

S4: combining an initial control variable V input by the user and received by the remote controller with the rotation matrix DCM to obtain a head-less attitude control variable C of the UAV; and S5: sending the head-less attitude control variable C to the unmanned aerial vehicle by the remote controller so that the unmanned aerial vehicle can adjust a flight attitude according to the head-less attitude control variable C.

Through the above described technical solutions, when the user triggers a head-less control key and uses the somatosensory remote controller to control the flight of the UAV, the UAV can fly according to the orientation of the user, regardless of the direction in which the head of the UAV is located. Moreover, since the heading angle of the somatosensory remote controller pointing to the UAV is calculated by the system in real time, the UAV may hover by taking the user as a center and taking the distance from the UAV to the user as the radius, when the user uses the somatosensory remote controller to control the UAV to fly leftward or rightward.

BRIEF DESCRIPTION OF THE DRAWINGS

The accompanying drawings required to be used in the description of the specific embodiments or the prior art are described briefly as follows so that the technical solutions according to the specific embodiments of the present disclosure or according to the prior art can be explained more clearly. It is apparent that the accompanying drawings in the following description show only some embodiments of the present disclosure. For those skilled in the art, other accompanying drawings may be obtained according to these accompanying drawings without creative efforts.

REFERENCE NUMBERS

1—controller; 2—first transmission module; 3—remote controller body;
4—motion sensor; 5—GPS locator; 6—somatosensory activation button;
7—custom key; 8—photo/video key; 9—first gimbal pitching key;
10—second gimbal pitching key; 11—second tricolor LED light; 12—active buzzer;
13—vibration motor; 14—power switch; 15—USB interface
16—battery; 17—power charging manager; 18—first tricolor LED light;
19—returning key; 20—taking-off and landing key; 21—on-board flight control system;
22—second transmission module; 23—microprocessor; 24—attitude and heading reference system;
25—locating module; 26—barometer module; 27—UAV.

DETAILED DESCRIPTION OF THE EMBODIMENT(S) OF THE DISCLOSURE

Hereinafter, the technical solutions of the disclosure are described clearly and completely with reference to the drawings. It is apparent that the described embodiments are only a few of the embodiments of the present disclosure, and do not constitute all the embodiments. All the other embodiments derived by those skilled in the art on the basis of the embodiments of the present disclosure without creative efforts will fall within the scope of protection of the present disclosure.

Figure 1:
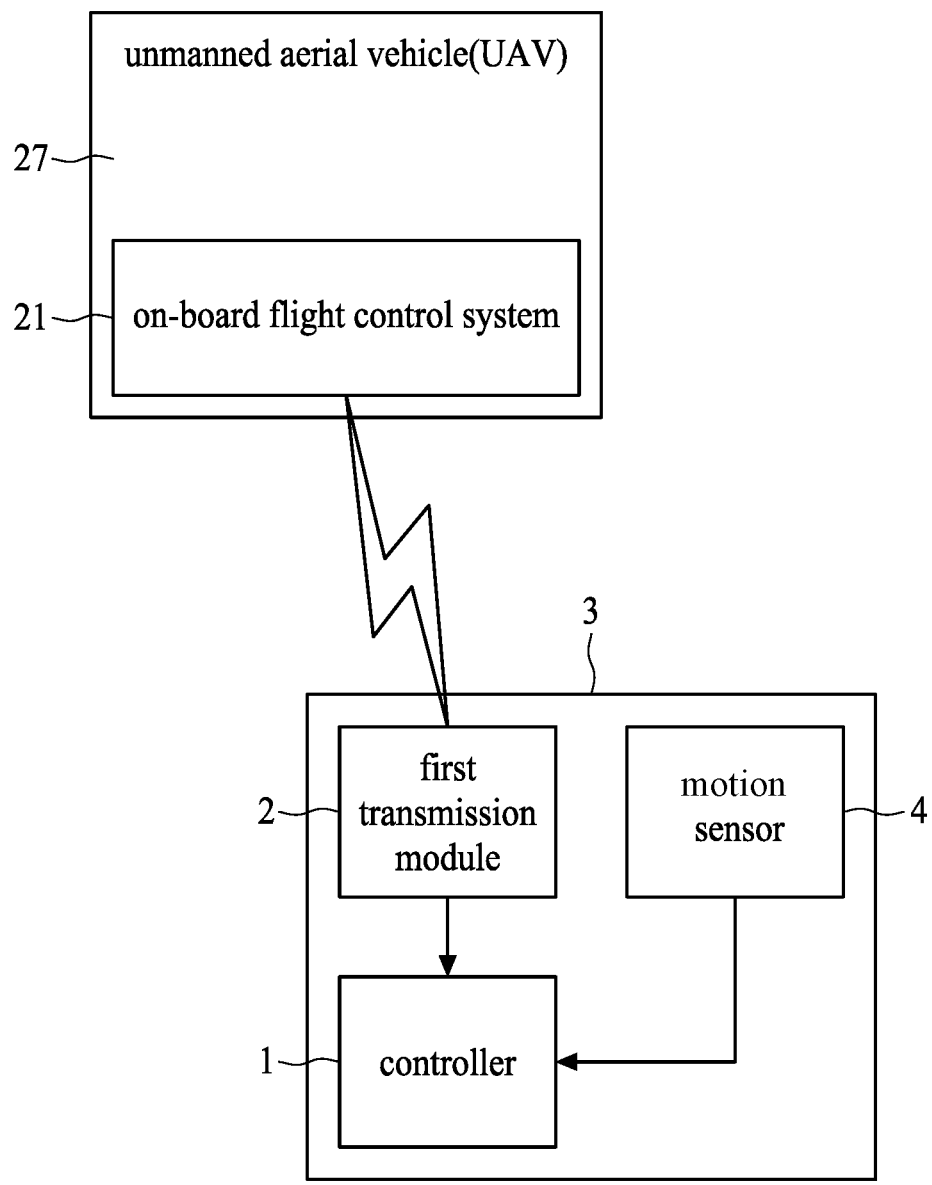
FIG. 1 is a schematic structural diagram of a somatosensory remote controller according to an embodiment of the present disclosure.

FIG. 1 is a schematic structural diagram of a somatosensory remote controller according to an embodiment of the present disclosure. As shown in FIG. 1, the somatosensory remote controller according to the embodiment of the present disclosure comprises: a motion sensor 4, a controller 1, a first transmission module 2, and a remote controller body 3. The motion sensor 4, the first transmission module 2 and the controller 1 are all arranged on the remote controller body 3, and both the motion sensor 4 and the first transmission module 2 are electrically connected to the controller 1. The motion sensor 4 is configured to acquire initial state information of the remote controller body 3 at the initial position, a movement information of the movement of the remote controller body 3, and to transmit the initial state information and the movement information to the controller 1. The controller 1 is configured to obtain a flight instruction according to the initial state information and the movement information, and to send the flight instruction via the first transmission module 2. The first transmission module 2 supports one or more transmission means of Bluetooth transmission, wireless fidelity (WiFi) transmission, infrared transmission, mobile network transmission, and wired transmission.

The initial state information comprises an angular velocity and an acceleration of the initial position, and the movement information comprises an angular velocity and an acceleration of the movement of the remote controller body 3 to the predetermined position.

The type of the motion sensor 4 may be various; preferably, the motion sensor 4 comprises a gyroscope and an accelerometer; the gyroscope and the accelerometer are arranged on the remote controller body 3 and are electrically connected to the controller 1; the gyroscope and the accelerometer are configured to acquire an angular velocity and an acceleration of the remote controller body 3 at the initial position respectively, and an angular velocity and an acceleration of the movement of the remote controller body 3 to the predetermined position; the controller 1 is configured to obtain a flight instruction according to the angular velocity and the acceleration at the initial position, and the angular velocity and the acceleration of the movement of the remote controller body 3 to the predetermined position, and to transmit the flight instruction to an on-board flight control system, and the on-board flight control system controls the flight of a UAV 27. More preferably, the motion sensor 4 may be MPU6050.

The type of the first transmission module 2 may be various, such as Bluetooth, WiFi, infrared, etc. Preferably, a wireless transmission module may be one of a 915 MHz wireless transmission module and a 5.8 GHz wireless transmission module.

In the somatosensory remote controller according to the embodiment of the present disclosure, the motion sensor 4 is used to acquire the initial state information of the remote controller body 3 at the initial position, and the movement information of the movement of the remote controller body 3 to the predetermined position, and the controller 1 is used to obtain a flight instruction according to the initial state information and the movement information. When the operator uses the somatosensory remote controller to control the UAV 27, the motion sensor 4 will acquire the initial state information of the current position of the remote controller, and the current position is taken as the center position.

When the operator is moving the remote controller body 3, a flight instruction is obtained based on the initial state information in combination with the movement information. For example, on the basis of the initial position, if the somatosensory remote controller is tilted forward, the UAV 27 may be controlled to fly forward or to dip the head downward; if the somatosensory remote controller is tilted backward, the UAV 27 may be controlled to fly backward or pitch up the tail forward; if the somatosensory remote controller is tilted leftward, the UAV 27 may be controlled to fly leftward or roll leftward; and if the somatosensory remote controller is tilted rightward, the UAV 27 may be controlled to fly rightward or roll rightward, etc.

Since any position of the somatosensory remote controller in the present disclosure can be taken as the center position of the somatosensory remote controller, the operator does not need to find the center position of the somatosensory remote controller, and the requirements on the technical level of the operator are reduced, thus facilitating the operator's operation.

Figure 2:
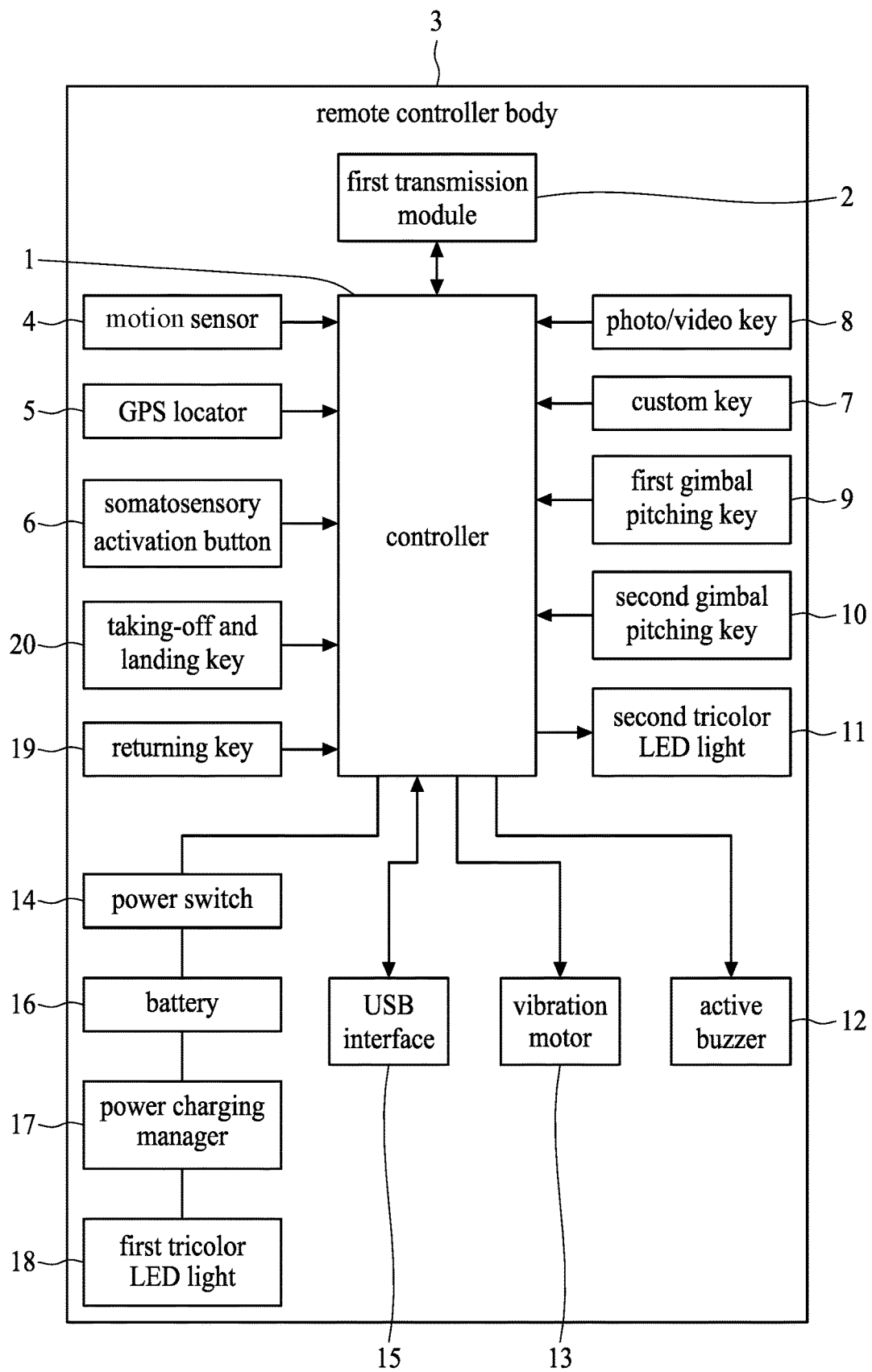
FIG. 2 is a schematic structural diagram of a somatosensory remote controller according to another embodiment of the present disclosure.

FIG. 2 is a schematic structural diagram of a somatosensory remote controller according to another embodiment of the present disclosure. As shown in FIG. 1 and FIG. 2, on the basis of the above described embodiment, further, a somatosensory activation button 6 is also arranged on the somatosensory remote controller body 3; the somatosensory activation button 6 is electrically connected to the controller 1, and the current position of the remote controller body 3 becomes the initial position after the somatosensory activation button 6 is pressed.

When the operator uses the somatosensory remote controller to control the UAV, the somatosensory activation button 6 is pressed to activate the controller 1, the initial state information of the position where the remote controller body 3 is currently located is recorded by the motion sensor 4, and this position is taken as the center position. In this way, the UAV 27 can be controlled only by moving the somatosensory remote controller body 3 after the operator presses the somatosensory activation button 6, thereby reducing the possibility of misoperation. In addition, it also facilitates the operator in controlling the UAV 27 after a suitable operation orientation for the operator himself/herself is found.

As shown in FIG. 2, on the basis of the above described embodiment, further, the remote controller body 3 is also provided with a GPS locator 5 and a returning key 19. The GPS locator 5 is electrically connected to the controller and used to locate the position of the remote controller body; the returning key 19 is electrically connected to the controller and used to control the return of the UAV 27 based on the position located by the GPS locator.

The remote controller body 3 is further provided with a taking-off and landing key 20, which is electrically connected to the controller 1 and used to control the taking-off and landing of the UAV 27.

The remote controller body 3 is further provided with two gimbal pitching keys, i.e., a first gimbal pitching key 9 and a second gimbal pitching key 10 which are used to control a dipping operation and a pitching-up operation of the gimbal of the UAV respectively.

The remote controller body 3 is further provided with a custom key, and the user can customize the functions of this key. Specifically, multiple optional functions may be provided for the user. For example, the key may be selected to be a following mode key for controlling the UAV to follow the movement of the somatosensory remote controller; that is, after the following mode is activated, the somatosensory remote controller moves, and the UAV also moves therewith. For another example, the key may be selected to be a hovering function key for controlling the UAV to hover.

The remote controller body 3 is further provided with a photo/video key 8, which is electrically connected to the controller 1 and used to control the photographing and videotaping. The videotaping function may be activated by a long-press of the key, then the videotaping function is deactivated by a further long-press of the key, and the photographing function is activated.

In this embodiment, the design of the functional key of the somatosensory remote controller for the UAV enables the operator to realize different functions with the simple key-pressing steps, and the same functions can be realized using only one key, thus making the operation simple and quick.

Of course, a power switch 14, a forward key, a backward key, an acceleration key or the like may further be provided on the remote controller body 3 in this embodiment.

As shown in FIG. 2, on the basis of the above described embodiment, further, a battery 16 is also arranged inside the remote controller body 3; a power switch 14 is also arranged on the remote controller body 3, and the battery 16 is electrically connected to the controller 1 via the power switch 14; a first tricolor LED light 18 and a power charging manager 17 are also arranged on the remote controller body 3, the first tricolor LED light 18 is electrically connected to the battery 16 via the power charging manager 17, and the first tricolor LED light 18 is used to display the charging state of the battery 16; a USB interface 15 is also arranged on the remote controller body 3, and the USB interface 15 is electrically connected to the controller 1 and used to upgrade firmware or to charge the battery 16.

As shown in FIG. 2, on the basis of the above described embodiment, further, a vibration motor 13 and an active buzzer 12 are further arranged on the remote controller body 3, and both the vibration motor 13 and the active buzzer 12 are electrically connected to the controller 1. The vibration motor 13 and the active buzzer 12 may be used in combination with the GPS locator 5. When the UAV 27 deviates from a predetermined flight trajectory or arrives at a predetermined destination, the operator may be reminded. Of course, the vibration motor 13 and the active buzzer 12 may be also used to cooperate with operator's actions to increase the pleasant sensation of the operator in manipulation. For example, each time the operator performs one action, the vibration motor 13 vibrates or the active buzzer 12 makes a sound.

As shown in FIG. 2, on the basis of the above described embodiment, further, a second tricolor LED light 11 is also arranged on the remote controller body 3, and the second tricolor LED light 11 is electrically connected to the controller 1 and used to display the flying state of the UAV 27.

Figure 3:
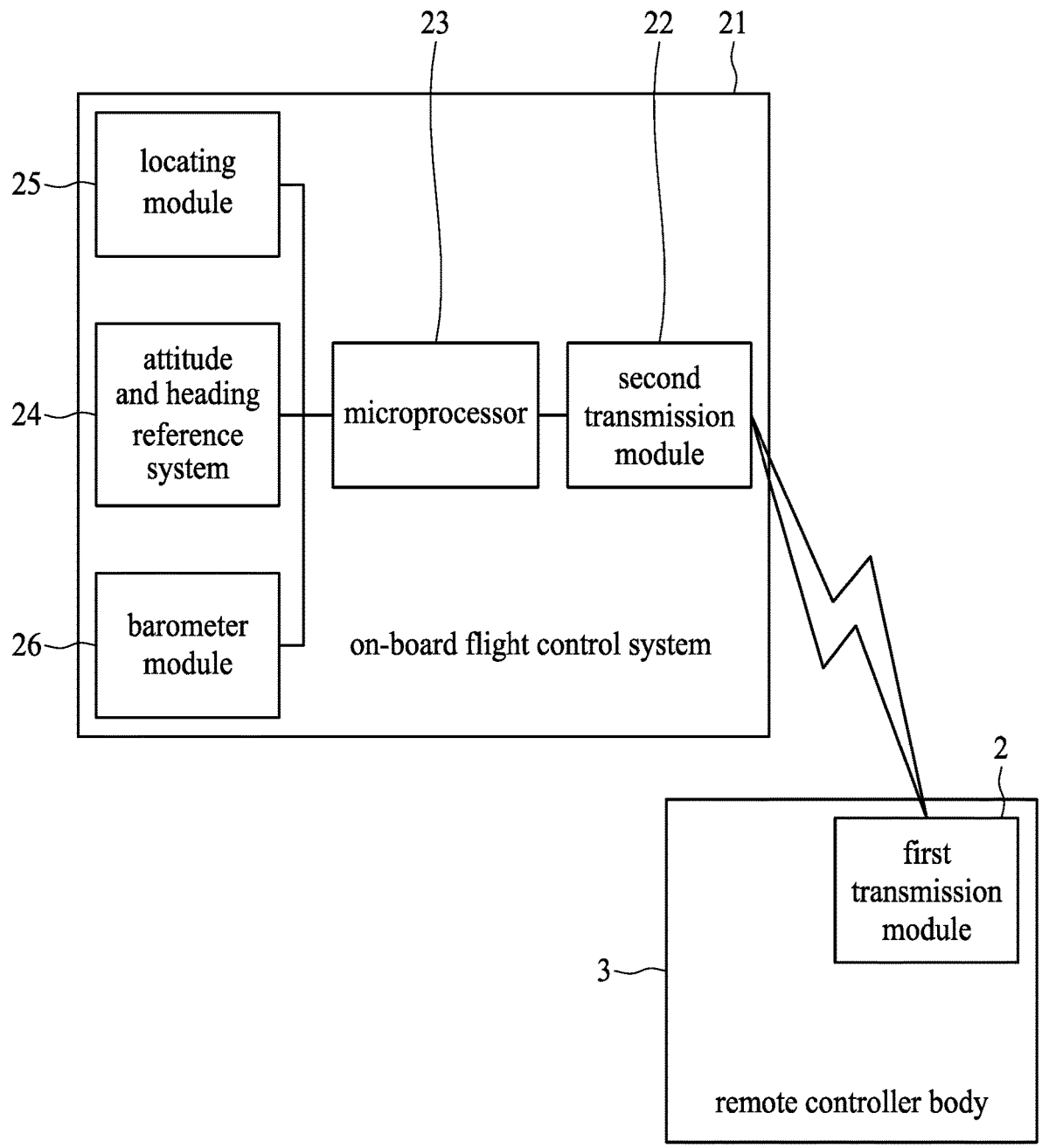
FIG. 3 is a schematic structural diagram of a somatosensory remote control flight system according to an embodiment of the present disclosure.

FIG. 3 is a schematic structural diagram of a somatosensory remote control flight system according to an embodiment of the present disclosure. As shown in FIG. 3, a somatosensory remote control flight system is further provided according to an embodiment of the present disclosure, which comprises: an on-board flight control system 21 and the somatosensory remote controller describe above. A second transmission module 22 is arranged on the on-board flight control system 21, and the second transmission module 22 is communicatively connected to the first transmission module 2 in a wireless manner; the on-board flight control system 21 is used to control the UAV 27 to fly in response to the flight instruction.

The on-board flight control system 21 further comprises a locating module 25, an attitude and heading reference system 24, a barometer module 26, and a microprocessor 23; the microprocessor 23 is used to acquire flight information of the UAV 27 via the locating module 25, the attitude and heading reference system 24 and the barometric module 26, and to transmit the flight information to the somatosensory remote controller via the second transmission module 22.

In this embodiment, the on-board flight control system 21 transmits the flight information to the somatosensory remote controller, and the somatosensory remote controller may adjust the flight attitude of the UAV 27 according to the flight information so that the UAV 27 can fly beyond visual range.

Figure 4:
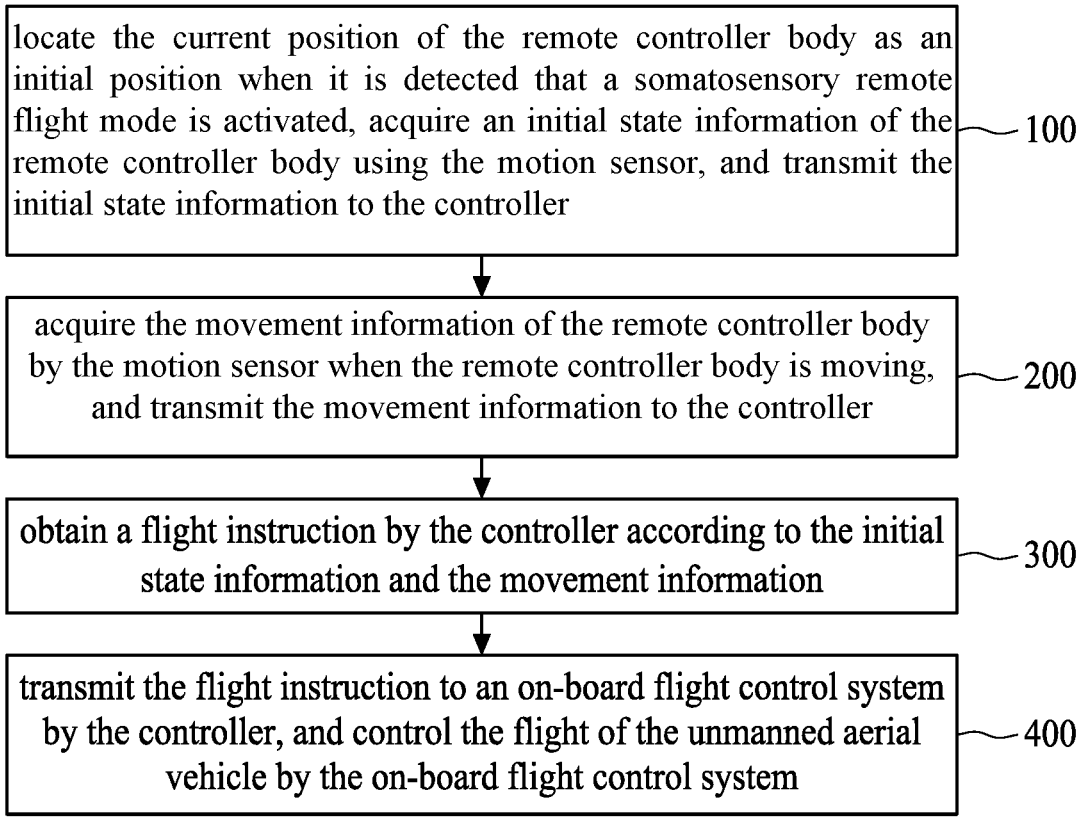
FIG. 4 is a flowchart of a somatosensory remote control flight method according to an embodiment of the present disclosure.

FIG. 4 is a flowchart of a somatosensory remote control flight method according to an embodiment of the present disclosure. As shown in FIG. 4, a somatosensory remote control flight method is further provided according to an embodiment of the present disclosure, which specifically comprises the following steps:

step 100: locating the current position of the remote controller body 3 as an initial position when it is detected that a somatosensory remote flight mode is activated, acquiring initial state information of the remote controller body 3 using the motion sensor 4, and transmitting the information to the controller 1;

step 200: acquiring movement information of the remote controller body 3 by the motion sensor 4 when the remote controller body 3 is moving, and transmitting the movement information to the controller 1;

step 300: obtaining a flight instruction by the controller 1 according to the initial state information and the movement information; and step 400: transmitting the flight instruction to the on-board flight control system 21 by the controller 1, and controlling the flight of the UAV 27 by the on-board flight control system 21.

In the somatosensory remote control flight method according to the embodiment of the present disclosure, the motion sensor 4 is used to acquire the initial state information of the initial position of the remote controller body 3, and the movement information of the movement of the remote controller body 3 to the predetermined position, and the controller 1 is used to obtain a flight instruction according to the initial state information and the movement information. When the operator uses the somatosensory remote controller to control the UAV 27, the motion sensor 4 will acquire the initial state information of the current position of the remote controller, and the current position is taken as the center position. When the operator moves the remote controller body 3, a flight instruction is obtained based on the initial state information in combination with the movement information. In this way, any position of the remote controller body 3 can be taken as the center position of the somatosensory remote controller, and therefore the operator no longer needs to find the center position of the somatosensory remote controller. The requirements on the technical level of the operator are reduced, thus facilitating the operator's operation.

Figure 5:
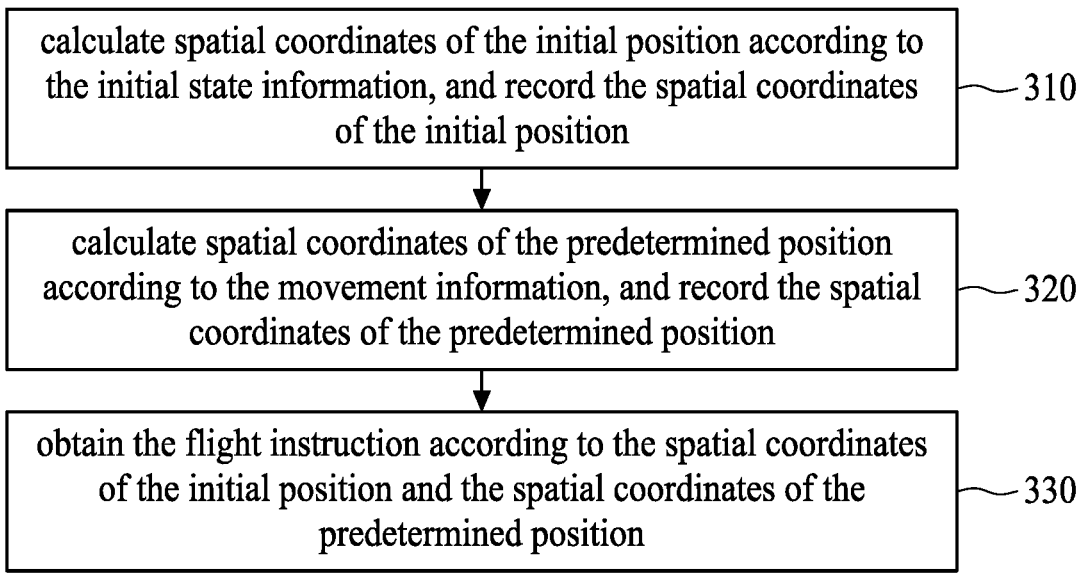
FIG. 5 is a flowchart of a somatosensory remote control flight method according to another embodiment of the present disclosure.

FIG. 5 is a flowchart of a somatosensory remote control flight method according to another embodiment of the present disclosure. As shown in FIG. 5, on the basis of the above-described embodiment, further, the step 300 of obtaining a flight instruction by the controller according to the initial state information and the movement information specifically comprises the following steps:

step 310: calculating spatial coordinates of the initial position according to the initial state information, and recording the spatial coordinates of the initial position;

step 320: calculating spatial coordinates of the predetermined position according to the movement information, and recording the spatial coordinates of the predetermined position; and step 330: obtaining the flight instruction according to the spatial coordinates of the initial position and the spatial coordinates of the predetermined position.

In this embodiment, the spatial coordinates of the somatosensory remote controller at the initial position, namely the center position, are calculated by the controller 1 according to the obtained initial state information, and then the spatial coordinates of the predetermined position are calculated by the controller 1 according to the movement information. The movement trajectory of the remote controller body 3 in the spatial coordinate system is precisely acquired based on the movement of the remote controller body 3 in the spatial coordinate system, and thus a precise control of the UAV 27 is realized.

Figure 6:
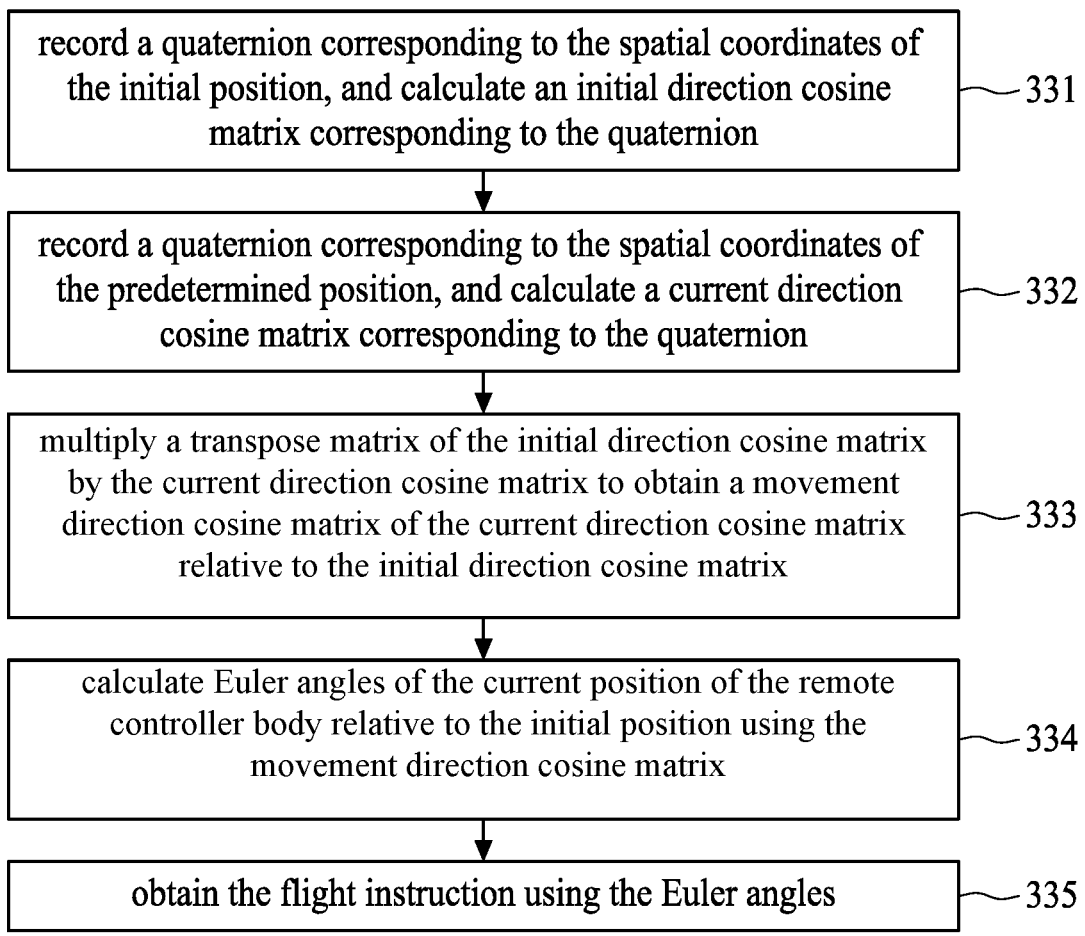
FIG. 6 is a flowchart of a somatosensory remote control flight method according to further another embodiment of the present disclosure.

FIG. 6 is a flowchart of a somatosensory remote control flight method according to further another embodiment of the present disclosure. As shown in FIG. 6, on the basis of the above described embodiment, further, the step 330 of obtaining the flight instruction according to the spatial coordinates of the initial position and the spatial coordinates of the predetermined position specifically comprises the following steps:

step 331: recording a quaternion corresponding to the spatial coordinates of the initial position, and calculating an initial direction cosine matrix $DCM_{init}$ corresponding to the quaternion;

step 332: recording a quaternion corresponding to the spatial coordinates of the predetermined position, and calculating a current direction cosine matrix $DCM_{cur}$ corresponding to the quaternion;

step 333: multiplying a transpose matrix of the initial direction cosine matrix by the cosine matrix in the current direction to obtain a movement direction cosine matrix $DCM_{relative}$ of the current direction cosine matrix relative to the initial direction cosine matrix;

step 334: calculating Euler angles of the current position of the remote controller body 3 relative to the initial position using the movement direction cosine matrix; and step 335: obtaining the flight instruction using the Euler angles.

The quaternion is a mathematical concept discovered by Irish mathematician Hamilton Luyun William in 1843. The multiplication of quaternions does not conform to the commutative law. Specifically, the quaternion is a non-exchangeable extension of plurals. If the set of quaternions is considered as a multidimensional space of real numbers, the quaternion represents a four-dimensional space, and correspondingly the plural represents a two-dimensional space.

In this embodiment, the change amount of the remote controller body 3 in the spatial coordinate system and based on the initial position can be rapidly calculated using the quaternions, namely Euler angles of the rotation of the remote controller body 3. Therefore, the amount of calculation is reduced, the operating efficiency of the controller 1 is improved, and meanwhile the control accuracy can be further improved.

In the above described technical solution, firstly, upon receiving the somatosensory activation instruction, the somatosensory remote controller acquires the initial quaternion $q_{init}$ of the remote controller at this point, and the initial quaternion is $q_{int}=[, x, y, z]$, where w, x, y and z are four parameters of the quaternion $q_{init}$. The somatosensory remote controller uses a gyroscope and an accelerometer to calculate the quaternions. The four parameters in $q_{init}$ are:

w=cos(theta/2);
x=ax*sin(theta/2);
y=ay*sin(theta/2);
z=az*sin(theta/2);

where (ax, ay, az) represents a vector of the axis, and theta represents the rotation angle around this axis.

Through the above described technical solution, the quaternion $q_{init}$ when the somatosensory remote controller is in the initial state can be rapidly and accurately calculated, and the $q_{init}$ is converted into the initial direction cosine matrix $DCM_{init}$ as follows:

$$DCM_{init} = \begin{bmatrix} 1-2y^2-2z^2 & 2xy+2wz & 2xz-2wy \\ 2xy-2wz & 1-2x^2-2z^2 & 2yz+2wx \\ 2xz+2wy & 2yz-2wx & 1-2x^2-2y^2 \end{bmatrix}.$$

Preferably, the step 322 specifically comprises:

recording one current quaternion $q_{cur}$ every predetermined time period, and converting the current quaternion $q_{cur}$ into a current direction cosine matrix $DCM_{cur}$.

In the above described technical solution, the current quaternion $q_{cur}$ may be recorded once every predetermined time period, and then the $q_{cur}$ is converted into the current direction cosine matrix $DCM_{cur}$. The conversion relationship between the current quaternion $q_{cur}$ and the current direction cosine matrix $DCM_{cur}$ is expressed as follows:

$$qcur = [w, x, y, z]$$

$$DCM_{cur} = \begin{bmatrix} 1-2y^2-2z^2 & 2xy+2wz & 2xz-2wy \\ 2xy-2wz & 1-2x^2-2z^2 & 2yz+2wx \\ 2xz+2wy & 2yz-2wx & 1-2x^2-2y^2 \end{bmatrix}$$

Preferably, the predetermined time period is in a range from 10 ms to 20 ms.

In the above-described technical solution, in order to ensure the realtimeness of acquiring the current quaternion $q_{cur}$, the predetermined time period is set to be in a range from 10 ms to 20 ms.

Preferably, the movement direction cosine matrix $DCM_{relative}$ is $$DCM_{relative}=DCM_{init}{}^{T}*DCM_{cur}$$

Figure 7:
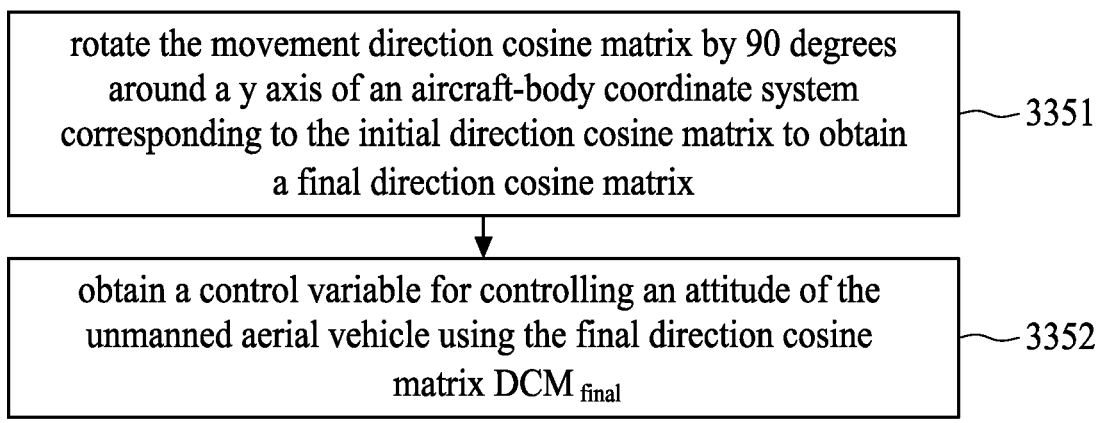
FIG. 7 is a flowchart of a somatosensory remote control flight method according to still further another embodiment of the present disclosure.
Figure 8:
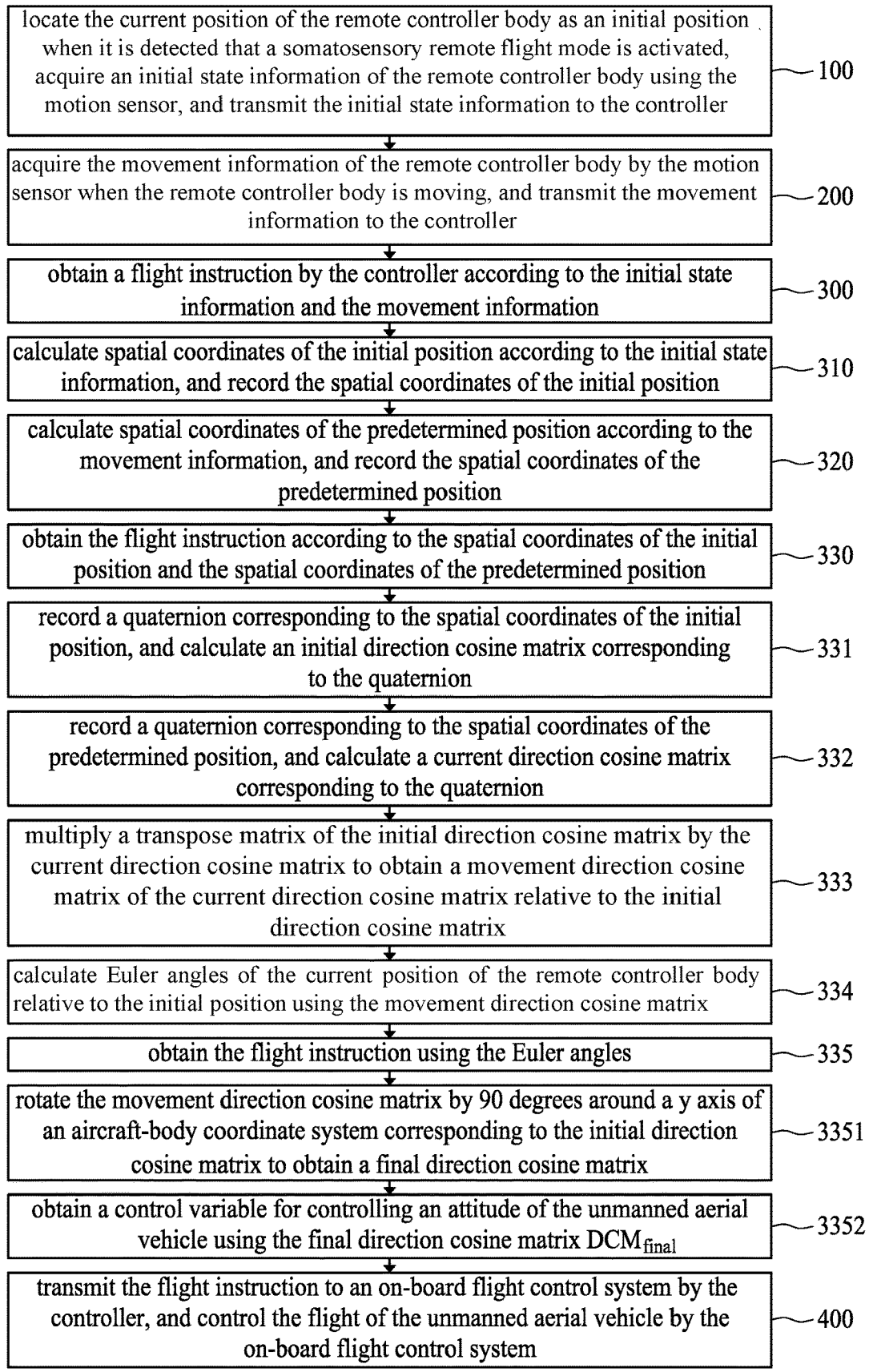
FIG. 8 is a general flowchart of a somatosensory remote control flight method according to an embodiment of the present disclosure.

FIG. 7 is a flowchart of a somatosensory remote control flight method according to another embodiment of the present disclosure; and FIG. 8 is a general flowchart of the somatosensory remote control flight method according to the embodiment of the present disclosure. As shown in FIG. 7 and FIG. 8, on the basis of the above described embodiments, further, the step 335 of obtaining the flight instruction using the Euler angles specifically comprises the following steps:

step 3351: rotating the movement direction cosine matrix by 90 degrees around a y axis of an aircraft-body coordinate system corresponding to the initial direction cosine matrix so as to obtain a final direction cosine matrix $DCM_{final}$ and step 3352: obtaining a control variable for controlling the attitude of the UAV using the final direction cosine matrix $DCM_{final}$.

Specifically, the final direction cosine matrix $DCM_{final}$ may be converted into Euler angles, and the control variable for controlling the attitude of the UAV can be obtained through conversion of the Euler angles. There are singularities of the Euler angles in a case that the pitching angle is in a range from 90 degrees to −90 degrees. In order to avoid the positions of the singularities of the Euler angles, the vicinity of the center of the somatosensory remote controller needs to be turned into the positions of the singularities of the Euler angles so that the control is more sensitive. Therefore, the final direction cosine matrix $DCM_{final}$ is obtained by rotating the pitching angle corresponding to the movement direction cosine matrix $DCM_{relative}$ by 90 degrees.

The rotation is performed as follows:

$$DCM_{final} = \begin{bmatrix} 0 & 0 & -1 \\ 0 & 1 & 0 \\ 1 & 0 & 0 \end{bmatrix} * DCM_{relative}.$$

Preferably, a three-dimensional coordinate system is established by using the center of the motion sensor on the somatosensory remote controller as the coordinate origin O, and the Euler angles comprise:

a rotation value roll of the somatosensory remote controller around the X axis, a rotation value pitch of the somatosensory remote controller around the Y axis, and a rotation value yaw of the somatosensory remote controller around the Z axis.

In the above described technical solution, in order to allow the UAV to better complete corresponding actions according to a gesture of the user, a coordinate system that takes the center of the motion sensor as the coordinate origin O needs to be established, and the roll, pitch, and yaw are used to represent the rotation value around the X axis, the rotation value around the Y axis and the rotation value around the Z axis, respectively. In this way, the gesture of the user can be directly converted into the corresponding Euler angles, then this corresponding Euler angles can be converted into the corresponding control variable for controlling the UAV, and the corresponding control variable can be converted into a control electrical signal, which is sent to the UAV to control the flight of the UAV.

Preferably, the rotation value pitch of the somatosensory remote controller around the Y axis is:

$$\text{pitch}=\arcsin(-DCM_{final}[2][0]).$$

Preferably, the values of roll and yaw are determined according to the value of pitch:

in a case that $\left|\text{pitch} \pm \frac{\pi}{2}\right| < 0.001$, roll = 0, $$\text{yaw} = \arctan\left(\frac{DCM_{final}[1][2] - DCM_{final}[0][1]}{DCM_{final}[0][2] + DCM_{final}[1][1]}\right); \text{ and}$$

in a case that $\left|\text{pitch} \pm \frac{\pi}{2}\right| \geq 0.001$, $$\text{roll} = \arctan\left(\frac{DCM_{final}[2][1]}{DCM_{final}[2][2]}\right),$$

$$\text{yaw} = \arctan\left(\frac{DCM_{final}[1][0]}{DCM_{final}[0][0]}\right).$$

In the above described technical solution, firstly, the rotation value roll of the UAV around the X axis is obtained according to $DCM_{final}$, then it is determined whether $$\left|\text{pitch} \pm \frac{\pi}{2}\right|$$

is less than 0.001. If $$\left|\text{pitch} \pm \frac{\pi}{2}\right|$$

is less than 0.001, the rotation value roll around the X axis is 0, and the rotation value around the Z axis is:

$$\text{yaw} = \arctan\left(\frac{DCM_{final}[1][2] - DCM_{final}[0][1]}{DCM_{final}[0][2] + DCM_{final}[1][1]}\right).$$

Through the above described technical solution, the final direction cosine matrix $DCM_{final}$ can be converted into three-dimensional control variables pitch, roll, and yaw of the flight attitude of the UAV, and the specific values of pitch, roll, and yaw can be calculated. As such, the specific values of pitch, roll, and yaw can be converted into a control variable that can be sent to the UAV to control the flight attitude of the UAV, and the action that the user wants the UAV to complete can be performed.

In a specific implementation, the somatosensory remote controller according to the embodiments of the present application can be used to perform a head control over the UAV. However, under the head control mode, when the UAV flies far away or the flying distance of the UAV is beyond the visual range of the user, the user cannot distinguish the direction of the head of the UAV with eyes and cannot control the flight of the UAV well. In view of this, the disclosure provides a technical solution for the head-less control of the UAV, wherein when the user uses the somatosensory remote controller to control the flight of the UAV, the UAV can fly according to the orientation of the user, regardless of the direction in which the head of the UAV is located.

The specific embodiments of the present disclosure are further described in detail with reference to the accompanying drawings below.

Figure 9:
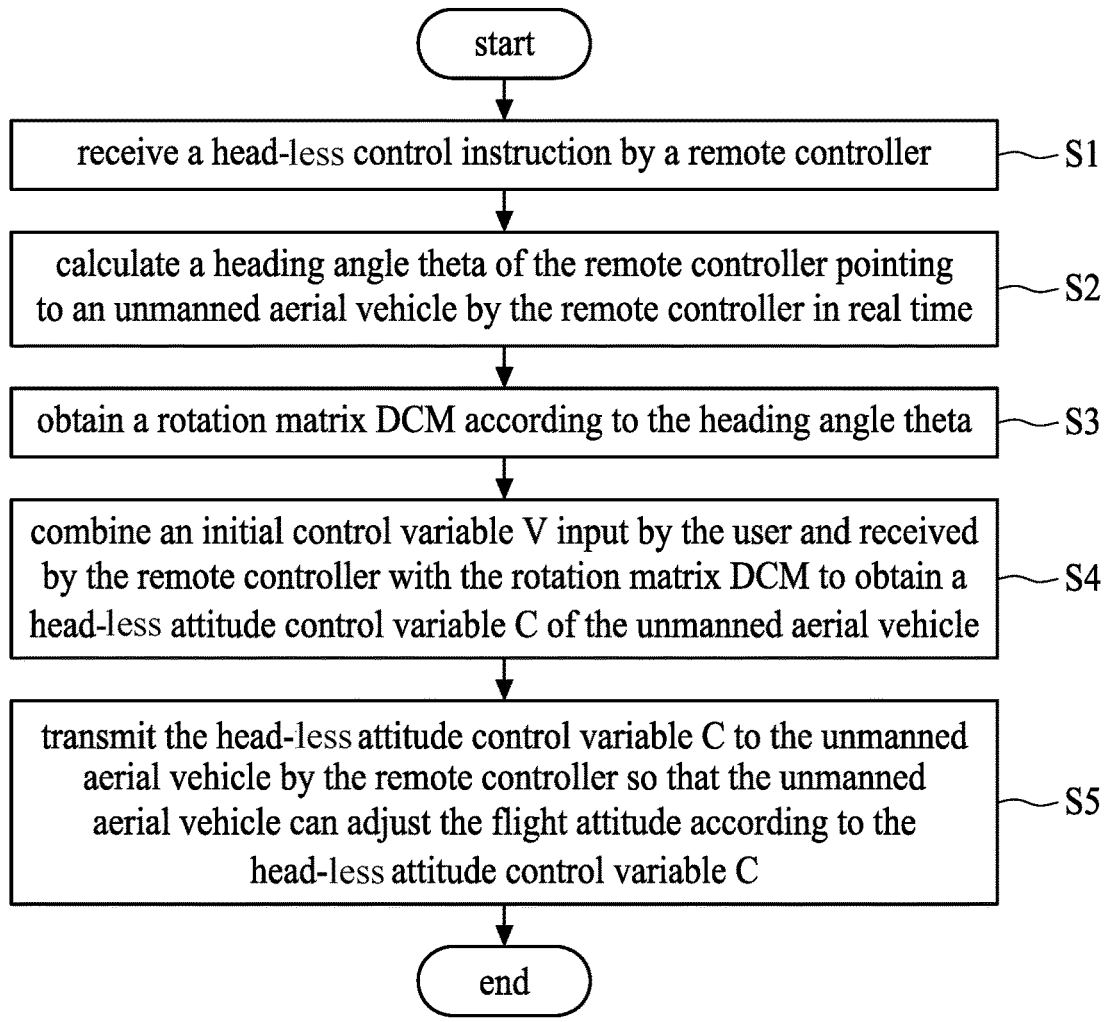
FIG. 9 is a flowchart of a head-less control method according to an embodiment of the present disclosure.

As shown in FIG. 9, a head-less control method is provided, which comprises:

S1: receiving a head-less control instruction by a somatosensory remote controller;

S2: calculating a heading angle theta of the somatosensory remote controller pointing to a UAV by the somatosensory remote controller in real-time;

S3: obtaining a rotation matrix DCM according to the heading angle theta;

S4: combining an initial control variable V input by the user and received by the somatosensory remote controller with the rotation matrix DCM so as to obtain a head-less attitude control variable C of the UAV; and S5: transmit the head-less attitude control variable C to the UAV by the somatosensory remote controller so that the UAV can adjust the flight attitude according to the head-less attitude control variable C.

In the above described technical solution, a head-less control key is provided on the somatosensory remote controller of the UAV; when the user presses the head-less control key, the heading angle theta of the somatosensory remote controller pointing to the UAV may be calculated by the system, thus the direction of the UAV relative to the somatosensory remote controller (that is, the direction of the UAV relative to the user) is known, and then the rotation matrix DCM is determined using the heading angle theta. In this way, when the user uses the somatosensory remote controller to send the initial control variable V to the UAV, the rotation matrix DCM may be assigned to the initial control variable V, the head-less attitude control variable C for controlling the UAV may be obtained, and the UAV may fly according to the head-less attitude control variable C. As such, the UAV can fly according to the orientation of the somatosensory remote controller (that is, the user) by using the above mentioned solution, regardless of the direction in which the head of the UAV is located.

Since the heading angle theta of the somatosensory remote controller pointing to the UAV is calculated by the system in real time, the UAV may hover by taking the user as a center and taking the distance from the UAV to the user as the radius, when the user uses the somatosensory remote controller to control the UAV to fly leftward or rightward.

For example, when the user uses the somatosensory remote controller to control the flight of the UAV, the user presses the head-less control key on the somatosensory remote controller and then uses the somatosensory remote controller to control the UAV to fly forward. In this way, regardless of the direction in which the head of the UAV is located, the UAV may fly toward the front of the user; if the user uses the somatosensory remote controller to control the UAV to fly backward, the UAV may fly toward the user; if the user uses the somatosensory remote controller to control the UAV to fly leftward or rightward, the UAV may hover clockwise or counterclockwise by taking the user as a center.

Through the above described technical solutions, when the user triggers the head-less control key and uses the somatosensory remote controller to control the flight of the UAV, the UAV can fly according to the orientation of the user, regardless of the direction in which the head of the UAV is located. Moreover, since the heading angle of the somatosensory remote controller pointing to the UAV is calculated by the system in real time, the UAV may hover by taking the user as a center and taking the distance from the UAV to the user as the radius, when the user uses the somatosensory remote controller to control the UAV to fly leftward or rightward.

The method further comprises a step Sa between the steps S1 and S2:

Sa: determining the flying state of the UAV according to whether a real-time distance S between the somatosensory remote controller and the UAV is within a dangerous distance range.

Figure 10:
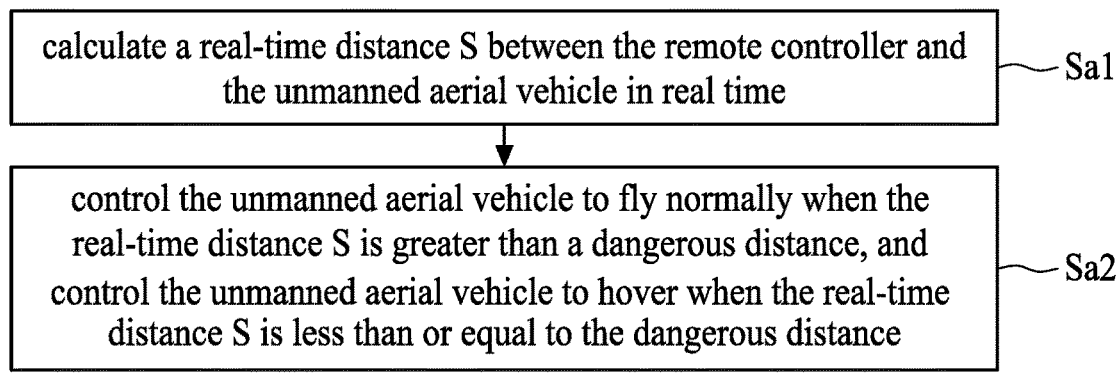
FIG. 10 is a flowchart of expansion of a step Sa according to an embodiment of the present disclosure.

Preferably, as shown in FIG. 10, the step Sa specifically comprises:

Sa1: calculating the real-time distance S between the somatosensory remote controller and the UAV in real time; and Sa2: controlling the UAV to fly normally in a case that the real-time distance S is greater than the dangerous distance, and controlling the UAV to hover in a case that the real-time distance S is less than or equal to the dangerous distance.

In the above described technical solution, in order to ensure the safety of the user and protect the user from being injured by the UAV in the event of falling due to fault, it is necessary to set a dangerous distance for the flight of the UAV. As such, after the user triggers the head-less control key, the system may calculate the real-time distance S between the remote controller and the UAV in real time. In a case that the calculated real-time distance S is less than or equal to the dangerous distance (that is, within the dangerous distance range), the user may control the UAV to hover in the air so that the UAV will not fly above the head of the user, thus eliminating safety hazards. Moreover, it is ensured that the UAV is always moving along the radius direction pointing to the position of the user in the back and forth movement when the UAV flies in the head-less mode.

Through the above described technical solution, the personal safety of the user is ensured and the safety factor of the UAV is improved.

Preferably, the step Sa1 specifically comprises:

acquiring a latitude lat1 and a longitude lon1 of the somatosensory remote controller and a latitude lat2 and a longitude lon2 of the UAV in real time;

calculating a latitude difference $\theta$=lat1−lat2 and a longitude difference b=lon1−lon2 between the somatosensory remote controller and the UAV; and calculating the real-time distance S between the somatosensory remote control and the UAV based on lat1, lon1, lat2, lon2, $\theta$, b, and earth_radius, where earth_radius represents the radius of the earth.

Preferably, the real-time distance S is:

$$S = \arcsin\left(\sqrt{\sin^2\left(\frac{\theta}{2}\right) + \cos(lat1)*\cos(lat2)*\sin^2\left(\frac{b}{2}\right)}\right) * \text{earth\_radius}$$

In the above described technical solution, when the head-less control key is triggered by the user, the latitude lat1 and the longitude lon1 of the remote controller and the latitude lat2 and the longitude lon2 of the UAV are acquired by using the GPS, then the latitude difference $\theta$=lat1−lat2 and the longitude difference b=lon1−lon2 between the somatosensory remote controller and the UAV are calculated, and then the real-time distance S can be calculated.

Preferably, the heading angle theta is:

theta=arctan 2*f*(sin(*b*)*cos(lat2),cos(lat1)*cos(lat2)
*sin(lat2)−sin(lat1)*cos(lat2)*cos(*b*)).

Preferably, the rotation matrix DCM is:

$$DCM = \begin{pmatrix} \cos(pitch)*\cos(yaw) & \sin(roll)*\sin(pitch)*\cos(yaw) - \cos(roll)*\sin(yaw) & \cos(roll)*\sin(pitch)*\cos(yaw) + \sin(roll)*\sin(yaw) \\ \cos(pitch)*\sin(yaw) & \sin(roll)*\sin(pitch)*\sin(yaw) + \cos(roll)*\cos(yaw) & \cos(roll)*\sin(pitch)*\sin(yaw) - \sin(roll)*\cos(yaw) \\ -\sin(pitch) & \sin(roll)*\cos(pitch) & \cos(roll)*\cos(pitch) \end{pmatrix}$$

where pitch=0, roll=0, and yaw=theta.

In the above described technical solution, the rotation matrix DCM is calculated and obtained based on the pitch, roll, and yaw, and pitch=0, roll=0, and yaw=theta are assigned to the rotation matrix DCM. As such, it can be considered that the direction of the head of the UAV has changed, the direction of the head becomes a front direction of the user, and it is convenient for the user to use the somatosensory remote controller to directly control the flight of the UAV.

Preferably, the step S4 specifically comprises:

receiving by the somatosensory remote controller the initial control variable V input by the user; and calculating the head-less attitude control variable C of the UAV.

Preferably, the initial control variable V is $$V = \begin{Bmatrix} V_{pitch} \\ V_{roll} \\ V_{thrust} \end{Bmatrix}$$

where $V_{pitch}$ represents the control variable of the back and forth movement of the UAV received by the somatosensory remote controller, $V_{roll}$ represents the control variable of the lateral movement of the UAV received by the remote controller, and $V_{thrust}$ represents the control variable of the up and down movement of the UAV received by the somatosensory remote controller.

Preferably, the head-less attitude control variable C of the UAV is $$C = \begin{Bmatrix} C_{pitch} \\ C_{roll} \\ C_{thrust} \end{Bmatrix}$$

where $C_{pitch}$ represents the attitude control variable of the back and forth movement of the UAV under the head-less control mode, $C_{roll}$ represents the attitude control variable of the lateral movement of the UAV under the head-less control mode, and $C_{thrust}$ represents the attitude control variable of the up and down movement of the UAV under the head-less control mode.

In the above described technical solution, after the control signal sent by the user using the somatosensory remote controller is received, the control signal is converted into the corresponding initial control variable V, and then the head-less attitude control variable C for controlling the flight of the UAV is obtained through a multiplication operation on the rotation matrix DCM and the initial control variable V. The UAV may adjust the flight attitude according to the head-less attitude control variable C, and may fly according to the orientation of the user.

Through the technical solutions of the present disclosure, when the user triggers the head-less control key and uses the somatosensory remote controller to control the flight of the UAV, the UAV can fly according to the orientation of the user, regardless of the direction in which the head of the UAV is located. Moreover, since the heading angle of the somatosensory remote controller pointing to the UAV is calculated by the system in real time, the UAV may hover by taking the user as a center and taking the distance from the UAV to the user as the radius, when the user uses the somatosensory remote controller to control the UAV to fly leftward or rightward.

Finally, it should be noted that the above embodiments are only used to illustrate the technical solutions of the present disclosure, and are not intended to limit the disclosure. While the present disclosure has been described in detail with reference to the above embodiments, it should be understood by those skilled in the art that various modifications and equivalent substitutions may be made to all or part of the technical solutions recorded in the above embodiments, and these modifications and equivalent substitutions will not make the essence of relevant technical solutions depart from the scope of the technical solutions of various embodiments of the disclosure.

What is claimed is:

1. A method for somatosensory remote flight control, comprising:
    obtaining an initial state information of a remote controller body using a motion sensor, and transmitting the initial state information to a controller;
    in response to movement of the remote controller body, obtaining a movement information of the remote controller body by using the motion sensor, and transmitting the movement information to the controller;
    obtaining a head-less flight instruction by the controller according to the initial state information and the movement information;
    transmitting the head-less flight instruction via a first transmission module thereby controlling an unmanned aerial vehicle (UAV) according to the head-less flight instruction;
    setting the UAV to the head-less mode by activating a head-less control key;
    obtaining a first latitude and a first longitude of the remote controller body subsequent to the activation of the head-less control button;
    obtaining a second latitude and a second longitude of the UAV subsequent to the activation of the head-less control button;
    calculating a real-time heading angle in a first direction from the remote controller body toward the UAV based on the first latitude, the first longitude, the second latitude, and the second longitude;
    obtaining a real-time distance between the UAV and the remote controller body based on the real-time heading angle of the UAV;
    controlling the UAV to hover in case of the real-time distance is less than or equal to a dangerous distance; and
    controlling the UAV to move back and forth along the first direction after setting the UAV to the head-less mode.

2. The method of claim 1, prior to the step of obtaining the initial state information of the remote controller body using the motion sensor, further comprises:
    activating a somatosensory remote control flight mode by a somatosensory activation button; and
    designating a current position of the remote controller body as an initial position.

3. The method of claim 1, wherein the step of obtaining the head-less flight instruction by the controller according to the initial state information and the movement information further comprises:
    calculating spatial coordinates of an initial position according to the initial state information, and recording the spatial coordinates of the initial position;
    calculating spatial coordinates of a predetermined position according to the movement information, and recording the spatial coordinates of the predetermined position; and
    obtaining the head-less flight instruction according to the spatial coordinates of the initial position and the spatial coordinates of the predetermined position.

4. The method of claim 3, wherein the step of obtaining the head-less flight instruction according to the spatial coordinates of the initial position and the spatial coordinates of the predetermined position further comprises:
    obtaining a rotation angle of the remote controller body according to the spatial coordinates of the initial position and the spatial coordinates of the predetermined position, wherein the rotation angle corresponds to a control variable to movement of the UAV of the remote controller body; and
    converting the corresponding control variable into an electrical signal for controlling the UAV.

5. The method of claim 1, wherein the UAV further comprises an on-board flight control system, the on-board flight control system being disposed with a second transmission module, and the second transmission module is communicatively connected to the first transmission module.

6. The method of claim 5, wherein the on-board flight control system further comprises a locating module, an attitude and heading reference system, a barometer module, and a microprocessor, the microprocessor is configured to obtain a flight information of the UAV via the locating module, the attitude and heading reference system, and the barometric module, and to transmit the flight information to the remote controller body via the second transmission module.

7. A head-less control method, comprising:
activating head-less control of an unmanned aerial vehicle (UAV) via a somatosensory remote controller;
transmitting a head-less attitude control variable to the UAV by the somatosensory remote controller; and
in response to receiving the head-less attitude control variable, the UAV flying according to an orientation of the somatosensory remote controller, comprising
obtaining a first latitude and a first longitude of the somatosensory remote controller subsequent to the activation of head-less control;
obtaining a second latitude and a second longitude of the UAV subsequent to the activation of head-less control;
calculating a real-time heading angle in a first direction from the somatosensory remote controller toward the UAV based on the first latitude, the first longitude, the second latitude, and the second longitude;
obtaining a real-time distance between the UAV and the somatosensory remote controller based on the real-time heading angle of the UAV; and
controlling the UAV to hover in case of the real-time distance is less than or equal to a dangerous distance; and
controlling the UAV to move back and forth along the first direction after setting the UAV to the head-less mode.

8. The method of claim 7, wherein prior to the step of transmitting the head-less attitude control variable to the UAV by the somatosensory remote controller, further comprising:
obtaining an attitude of the somatosensory remote controller; and
obtaining the head-less attitude control variable for controlling the UAV according to the attitude of the somatosensory remote controller.

9. The method of claim 7, further comprising:
controlling the UAV to move forward by the somatosensory remote controller, in which the UAV moves along a line pointing from the somatosensory remote controller toward the UAV;
controlling the UAV to move backward by the somatosensory remote controller, in which the UAV moves along a line pointing from the UAV toward the somatosensory remote controller; and
controlling the UAV to move leftward or rightward by the somatosensory remote controller, in which the UAV moves in clockwise or counterclockwise direction with respect to the somatosensory remote controller, wherein the somatosensory remote controller is taken as a center.

10. The method of claim 7, further comprising:
controlling the UAV to move normally when the real-time distance is greater than a dangerous distance.

11. The method of claim 7, wherein the somatosensory remote controller activates the head-less control of the UAV via a head-less control key.

12. A somatosensory remote controller, comprising:
a motion sensor;
a controller; and
a first transmission module,
wherein the motion sensor and the first transmission module are electrically connected to the controller, the motion sensor is configured to obtain an initial state information of an initial position of a somatosensory remote controller body, and a movement information of the somatosensory remote controller body, and to transmit the initial state information and the movement information to the controller,
the controller is configured to obtain a flight instruction according to the initial state information and the movement information, and to send the flight instruction via the first transmission module,
a somatosensory activation button, and the current position of the somatosensory remote controller body is designated as the initial position in response to the somatosensory activation button being pressed; and
a head-less control key, configured to set UAV to the head-less mode, wherein a first latitude of the somatosensory remote controller body, a first longitude of the somatosensory remote controller body, a second latitude of the UAV, and a second longitude of the UAV are obtained after activating the head-less control key, and the controller is configured to:
calculate a real-time heading angle in a first direction from the somatosensory remote controller body toward the UAV based on the first latitude, the first longitude, the second latitude, and the second longitude;
obtain a real-time distance between the UAV and the somatosensory remote controller body based on the real-time heading angle of the UAV;
control the UAV to hover in case of the real-time distance is less than or equal to a dangerous distance; and
control the UAV to move back and forth along the first direction after setting the UAV to the head-less mode.

13. The somatosensory remote controller of claim 12, wherein the first transmission module supports at least one of the transmission means of wireless transmission, infrared transmission, mobile network transmission, and wired transmission.

14. The somatosensory remote controller of claim 12, wherein the motion sensor comprises at least a gyroscope and an accelerometer,
the gyroscope and the accelerometer are electrically connected to the controller; the gyroscope and the accelerometer are respectively configured to obtain an angular velocity and an acceleration of the somatosensory remote controller body at the initial position, and an angular velocity and an acceleration of the movement of the somatosensory remote controller body when moving to a predetermined position;
the controller is configured to obtain the flight instruction according to the angular velocity and the acceleration at the initial position, and the angular velocity and the acceleration of the movement of the somatosensory remote controller body when moving to the predetermined position, and to transmit the flight instruction to an on-board flight control system,
wherein the on-board flight control system is configured to control a flying direction of the UAV.

15. The somatosensory remote controller of claim 12, wherein the somatosensory remote controller body further comprises a GPS locator electrically connected to the controller and used to locate a position of the remote controller.

16. The somatosensory remote controller of claim 15, wherein the somatosensory remote controller further comprises at least one of the following keys:
a returning key electrically connected to the controller and used to control a return of the UAV based on the position located by the GPS locator;

a taking-off and landing key electrically connected to the controller and used to control the taking-off and landing of the UAV;

a gimbal pitching key used to control the pitching operation of the gimbal of the UAV;

a custom key for the user to customize a functions of the custom key; and a photo/video key electrically connected to the controller and used to control photographing and videotaping.

17. The somatosensory remote controller of claim 12, further comprising:

a battery, disposed inside the somatosensory remote controller body; and a power switch, disposed on the somatosensory remote controller body, wherein the battery is electrically connected to the controller via the power switch.

18. The somatosensory remote controller of claim 17, wherein the somatosensory remote controller body further comprises:

a first tricolor LED light and a power charging manager, the first tricolor LED light being electrically connected to the battery via the power charging manager, and the first tricolor LED light being used to display a charging state of the battery;

a USB interface, the USB interface being electrically connected to the controller and used to upgrade firmware or to charge the battery;

a vibration motor and an active buzzer, the vibration motor and the active buzzer are electrically connected to the controller; and/or a second tricolor LED light, the second tricolor LED light being electrically connected to the controller and used to display the flying state of the UAV.

19. The method of claim 1, further comprising:

obtaining a rotation matrix DCM, wherein the rotation matrix DCM is:

$$DCM = \begin{pmatrix} \cos(\text{pitch})*\cos(\text{yaw}) & \sin(\text{roll})*\sin(\text{pitch})*\cos(\text{yaw}) - \cos(\text{roll})*\sin(\text{yaw}) & \cos(\text{roll})*\sin(\text{pitch})*\cos(\text{yaw}) + \sin(\text{roll})*\sin(\text{yaw}) \\ \cos(\text{pitch})*\sin(\text{yaw}) & \sin(\text{roll})*\sin(\text{pitch})*\sin(\text{yaw}) + \cos(\text{roll})*\cos(\text{yaw}) & \cos(\text{roll})*\sin(\text{pitch})*\sin(\text{yaw}) - \sin(\text{roll})*\cos(\text{yaw}) \\ -\sin(\text{pitch}) & \sin(\text{roll})*\cos(\text{pitch}) & \cos(\text{roll})*\cos(\text{pitch}) \end{pmatrix},$$

wherein pitch is set as 0, roll is set as 0, and yaw is set as the real-time heading angle after the activation of the head-less control button.

20. The method of claim 19, wherein controlling the UAV to move back and forth along the first direction comprises:

obtaining a head-less attitude control variable based on the rotation matrix DCM; and controlling the UAV to move based on the head-less attitude control variable.

* * * * *